(12) United States Patent
Mani et al.

(10) Patent No.: US 7,631,483 B2
(45) Date of Patent: Dec. 15, 2009

(54) METHOD AND SYSTEM FOR REDUCTION OF JET ENGINE NOISE

(75) Inventors: Ramani Mani, Niskayuna, NY (US); Paolo Graziosi, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 723 days.

(21) Appl. No.: 10/664,695

(22) Filed: Sep. 22, 2003

(65) Prior Publication Data
US 2005/0060982 A1 Mar. 24, 2005

(51) Int. Cl.
F02K 3/02 (2006.01)

(52) U.S. Cl. .......................... 60/226.1; 60/785; 181/214

(58) Field of Classification Search ................ 60/226.1, 60/785, 782, 39.093; 137/15.1; 244/53 B; 181/214; 415/119, 58.4, 914
See application file for complete search history.

(56) References Cited

U.S. PATENT DOCUMENTS

| | | | | | |
|---|---|---|---|---|---|
| 3,572,960 | A | * | 3/1971 | McBride | 415/115 |
| 3,735,593 | A | * | 5/1973 | Howell | 60/226.1 |
| 4,199,295 | A | * | 4/1980 | Raffy et al. | 415/115 |
| 4,255,083 | A | * | 3/1981 | Andre et al. | 415/119 |
| 4,419,045 | A | * | 12/1983 | Andre et al. | 415/119 |
| 5,048,288 | A | * | 9/1991 | Bessette et al. | 60/226.1 |
| 5,205,513 | A | * | 4/1993 | Schilling | 244/54 |
| 5,474,417 | A | * | 12/1995 | Privett et al. | 415/58.5 |
| 5,607,284 | A | * | 3/1997 | Byrne et al. | 415/58.5 |
| 5,732,547 | A | * | 3/1998 | Olsen et al. | 60/204 |
| 5,934,611 | A | * | 8/1999 | Tindell et al. | 244/53 B |
| 6,094,907 | A | * | 8/2000 | Blackner | 60/226.1 |
| 6,125,626 | A | * | 10/2000 | El-Aini et al. | 60/226.1 |
| 6,206,136 | B1 | | 3/2001 | Swindlehurst | |
| 6,546,734 | B2 | * | 4/2003 | Antoine et al. | 60/772 |
| 7,074,006 | B1 | * | 7/2006 | Hathaway et al. | 415/1 |

OTHER PUBLICATIONS

S.H. KO "Sound attenuation in acoustically lined circular ducts in the presence of uniform flow and shear flow" Journal of Sound and Vibration (1972) 22 (2), p. 193-210.

A.H. Nayfeh, J.E. Kaiser and B.S. Shaker "Effect of mean velocity profile shapes on sound transmission through two-dimensional ducts" Journal of Sound and Vibration 34 1974, p. 413-423.

R.A. Fiedler, F.B. Gessner "Influence of tangential fluid injection on the performance of two-dimensional diffusers" Transactions of the ASME Sep. 1972, p. 686-674.

* cited by examiner

Primary Examiner—William H Rodriquez
(74) Attorney, Agent, or Firm—Penny A. Clarke

(57) ABSTRACT

In an aspect, a method is provided for attenuating jet engine noise. Air velocity, adjacent to an inlet fan duct outer wall, is increased to a greater rate than typical velocity of an operational engine ambient inlet airflow, adjacent to the inlet fan duct outer wall. Boundary layer and associated turbulence is reduced or eliminated. Refraction and absorption of inlet sound into an acoustic liner is optimized. In an aspect, air velocity is increased by injecting air. In an aspect, air velocity is increased by exerting a suction force. In an aspect, a system is provided to attenuate jet engine noise. In an aspect, a fluid duct is provided opening to an inlet fan duct outer wall and to aft of a fan rotor.

14 Claims, 9 Drawing Sheets

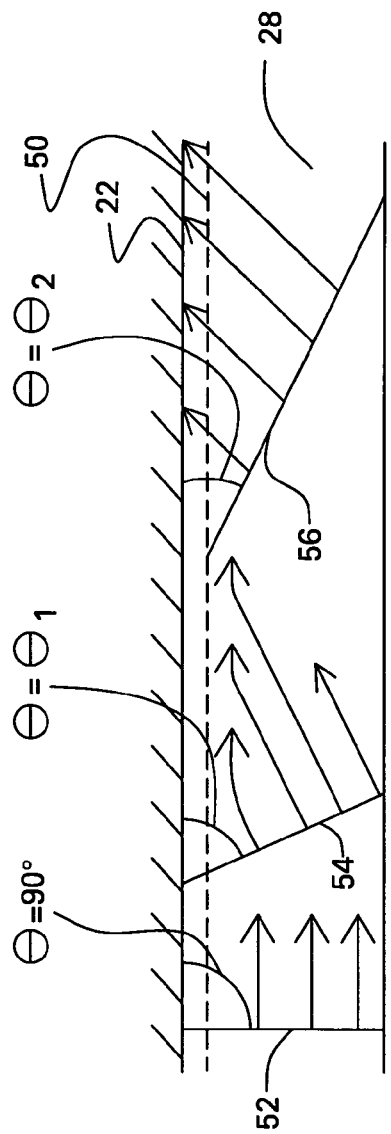
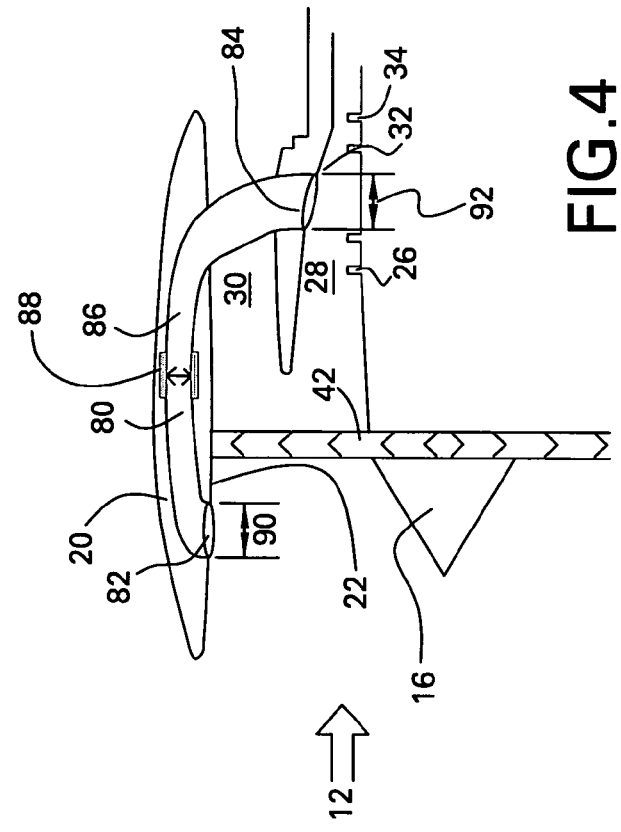

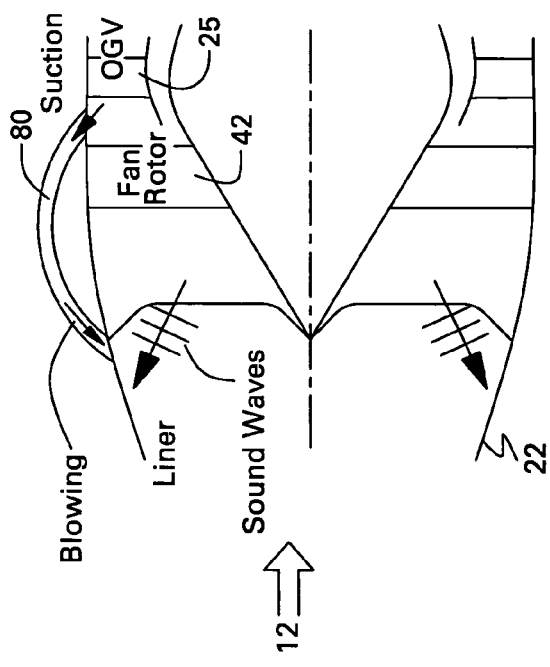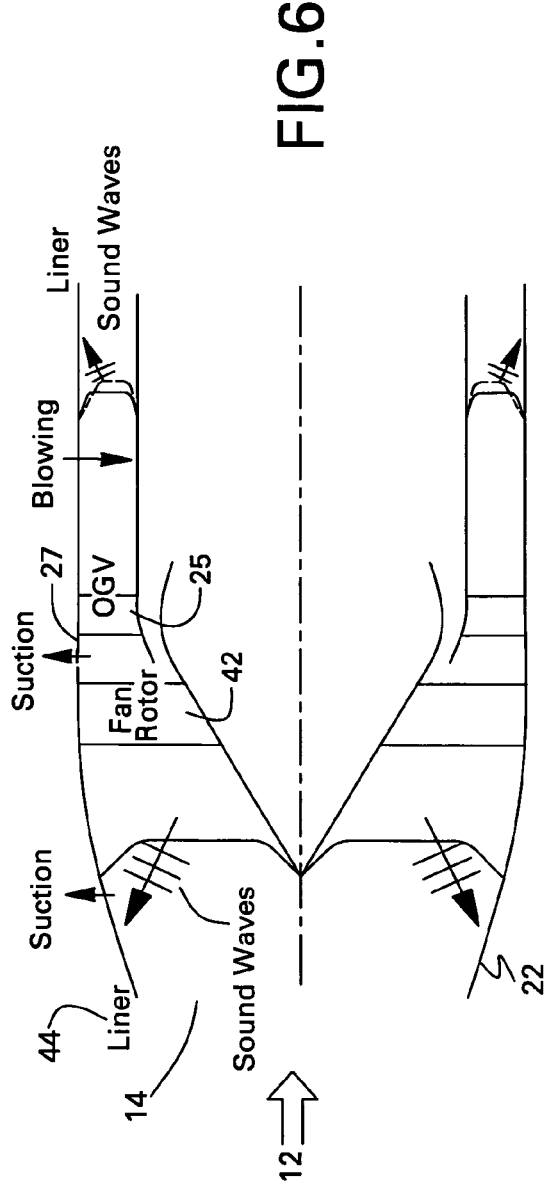

```
┌─────────────────────────────────────────────────────────────────┐
│ Increase air velocity adjacent to an inlet fan duct outer wall, to a greater │
│ rate than typical velocity of an operational engine ambient inlet air flow │
│ adjacent to the inlet fan duct outer wall. │
└─────────────────────────────────────────────────────────────────┘
                                  ↓
┌─────────────────────────────────────────────────┐
│ Reduce a boundary layer and associated turbulence │
│ adjacent to the inlet fan duct outer wall. │
└─────────────────────────────────────────────────┘
                                  ↓
┌─────────────────────────────────────────────────────┐
│ Optimize refraction and absorption of inlet sound into │
│ an acoustic liner along the inlet fan duct outer wall. │
└─────────────────────────────────────────────────────┘
                                  ↓
┌─────────────────────────────────────────────────────┐
│ Inject air adjacent to the inlet fan duct outer wall and │
│ substantially directed aft a fan, wherein the injected │
│ air is distinct from ambient inlet air. │
└─────────────────────────────────────────────────────┘
                                  ↓
┌─────────────────────────────────────┐
│ Extend air injection axially. │
└─────────────────────────────────────┘
                                  ↓
┌─────────────────────────────────────────────────────────┐
│ Extend air injection with substanial circumferential uniformity. │
└─────────────────────────────────────────────────────────┘
                                  ↓
┌─────────────────────────────────────────────────────┐
│ Inject a mass-flow of air within a range of one percent to │
│ two percent of the ambient inlet air. │
└─────────────────────────────────────────────────────┘
                                  ↓
┌─────────────────────────────────────────────────────┐
│ Draw air from at least one of a bypass flow stream │
│ (downstream a fan rotor and upstream a fan discharge │
│ outlet guide vane) and a core flow stream. │
└─────────────────────────────────────────────────────┘
                                  ↓
┌─────────────────────────────────────────────────────────┐
│ Create a pressure difference to self-aspirate the injecting │
│ air, wherein the inlet fan duct area has a first variable │
│ pressure, the bypass flow stream has a second variable │
│ pressure and the core stream has a third variable pressure. │
└─────────────────────────────────────────────────────────┘
```

FIG.9

METHOD AND SYSTEM FOR REDUCTION OF JET ENGINE NOISE

FIELD OF THE INVENTION

The invention relates to jet engine noise, and more particularly to attenuating jet engine noise utilizing fluidic control.

BACKGROUND OF THE INVENTION

Aircraft engine noise is a significant problem in high population areas and noise-controlled environments. Noise generated by aircraft engines during takeoff and landing is a matter of public concern in most parts of the world. Because of the adverse impact noise has on the environment, many countries have imposed strict noise emission standards on aircraft. In the United States, the Federal Aviation Administration has imposed strict noise emission standards that place stringent operating restrictions on aircraft that are currently in use. These restrictions range from financial penalties and schedule restrictions to an outright ban on the use of the aircraft. An effective and efficient method of noise attenuation is necessary since these restrictions severely curtail the useful life of certain types of aircraft that airlines are currently using.

Aircraft in use today commonly employ a turbofan engine. Turbofan engines draw air into the front of a nacelle duct by way of a fan and push the same air out the back at a higher velocity. The fan is a source of noise since the fan blades pushing through the air cause noise. Once past the fan, the air is split into two paths, the fan duct and the core duct. Downstream of the fan, the flow is swirling because of the spinning fan. This swirl causes loss of momentum before the air exits the nozzle so it is straightened out with stators. These stators are a large source of noise as the wakes of air from fan flow slap against the stators. This slapping takes place at the rate of blades passing by and generates a blade passage frequency tone. Nonuniformities and nonlinearities result in many higher frequency tones being produced. These tones are often associated with the piercing sound generated by some engines. Fan/stator interaction creates more than specific tones. The unsteadiness in the fan flow (turbulence) interacts with the stators to create broadband noise. This is often heard as a rumbling sound. The air passing through the core duct is further compressed through compressor stages. The compressed air is mixed with fuel and burned. Combustion is another source of noise. The hot, high-pressure combusted air is sent into a turbine. Since the turbine tends to look and act like a set of alternating rotors and stators, this is another source of noise. The core duct and the fan duct flows are exhausted into the air outside the back of the aircraft. The interaction of jet exhausts with the surrounding air generates broadband noise.

Known techniques for reducing aircraft engine noise include noise-absorbing acoustic liners that line the aircraft engine nacelle and surrounding engine areas. Absorptive liners utilize various configurations, including a honeycomb core sandwiched between an imperforate sheet and a perforate sheet having a small amount of open surface area. Tuned resonators, usually mounted at the engine inlet and outlet, are another noise control technique to reduce the level of discrete tones radiated outside the engine. Reduction of fan tip speed is a further noise reduction technique but has proved to be limiting relative to fan performance. Other techniques to reduce engine noise include source mechanisms such as respacing the rotor and stator. These techniques, however, require engine redesign and may significantly affect engine performance.

Much engine progress to date is associated with the development of the high bypass ratio turbo fan engine. Because the jet velocity in a high bypass engine is lower than in low or zero bypass engines, the exhaust noise associated with this engine is reduced. However, fan and compressor noise radiating from the engine inlet remains a problem. In fact, as turbine engines evolved from turbojet to turbofan engines, fan noise has become an increasingly large contributor of total engine noise. For high bypass ratio engines currently in use, fan noise dominates the total noise on approach and on takeoff. More specifically, the fan inlet noise is a major contributor to the total noise on approach, and the fan exhaust noise is dominant on takeoff. Acoustic wall treatment have been even less effective in reducing fan inlet noise than reducing fan exhaust noise.

The contribution of acoustic liners is primarily in attenuating fan exhaust noise where the propagating modes have a higher order and propagate away from the engine axis where liners can be most effective. In the fan inlet, the modes are propagating against the boundary layer, a thin layer of air along the duct wall that moves slower than the remainder of the airflow, and are refracted toward the engine axis, minimizing the effectiveness of liners. That is, absorptive liners are effective for attenuating high mode order noise, but are inefficient for attenuating low mode order noise, i.e., those noise wave fronts traveling along the duct at a low angular displacement relative to the duct walls. Low order modes, propagating at low angles, strike the liners fewer times in a given length of duct.

Also, the fluid in the boundary layer moves slower than the free ambient inlet air stream and cannot pass the same mass flow rate as the free ambient inlet air stream. As a result, the external flow is displaced outward an amount (the displacement thickness), by the slower moving fluid inside the boundary layer. Sound propagating at low angles is less likely to strike the liner because of the external flow being displaced outward. Moreover, as inlet fan ducts are being constructed with shorter lengths and various shapes are introduced, the effectiveness of acoustic liners is varied and reducing the boundary layer associated with the inlet flow becomes more important to attenuate noise.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 3 is a diagrammatic side-elevation illustrating sound wave propagation in a jet engine duct;

FIG. 4 is a schematic side-elevational, cross-sectional view of a portion of a turbine engine including a fluid duct, in an embodiment of the invention;

FIG. 5 is a schematic side-elevational, cross-sectional view of a portion of a turbine engine showing blowing and suction, in an embodiment of the invention;

FIG. 6 is another schematic side-elevational, cross-sectional view of a portion of a turbine engine showing blowing and suction, in an embodiment of the invention;

FIG. 9 is a block diagram of a method of attenuating jet engine noise, in an embodiment;

DETAILED DESCRIPTION OF THE INVENTION

Exemplary embodiments are described with reference to specific configurations. Those of ordinary skill in the art will appreciate that various changes and modifications can be made while remaining within the scope of the appended claims. Additionally, well-known elements, devices, components, methods, process steps and the like may not be set forth in detail in order to avoid obscuring the invention.

A method and system of attenuating jet engine noise is described herein. Features of the discussion and claims may be applied to various classes of engines including, turbojets, turbofans, turbopropellers, turboshafts, ramjets, rocket jets, pulse-jets, turbines, gas turbines, steam turbines, commercial engines, corporate engines, military engines, marine engines, etc. As used herein "jet engine" includes engines other than, and in addition to, aircraft engines. In an embodiment, a method and system of attenuating sound from an inlet fan duct and from a bypass flow duct is described. In an embodiment, air velocity adjacent to an inlet fan duct outer wall is increased to a greater rate than typical velocity of ambient inlet airflow adjacent to an inlet fan duct outer wall. A boundary layer and associated turbulence adjacent to a fan duct outer wall is reduced or eliminated. Refraction of sound into an acoustic liner is optimized and inlet fan duct sound is absorbed into an acoustic liner. In another embodiment, a fluid duct is described providing a system of attenuating sound from an inlet fan duct and a bypass flow duct. In an aspect, features of the discussion (for example, increasing fluid velocity adjacent to a wall) may be applied to other parts of a jet engine including core flow stream, compressor, combustion, turbine, mixer and nozzle.

Figure 1:
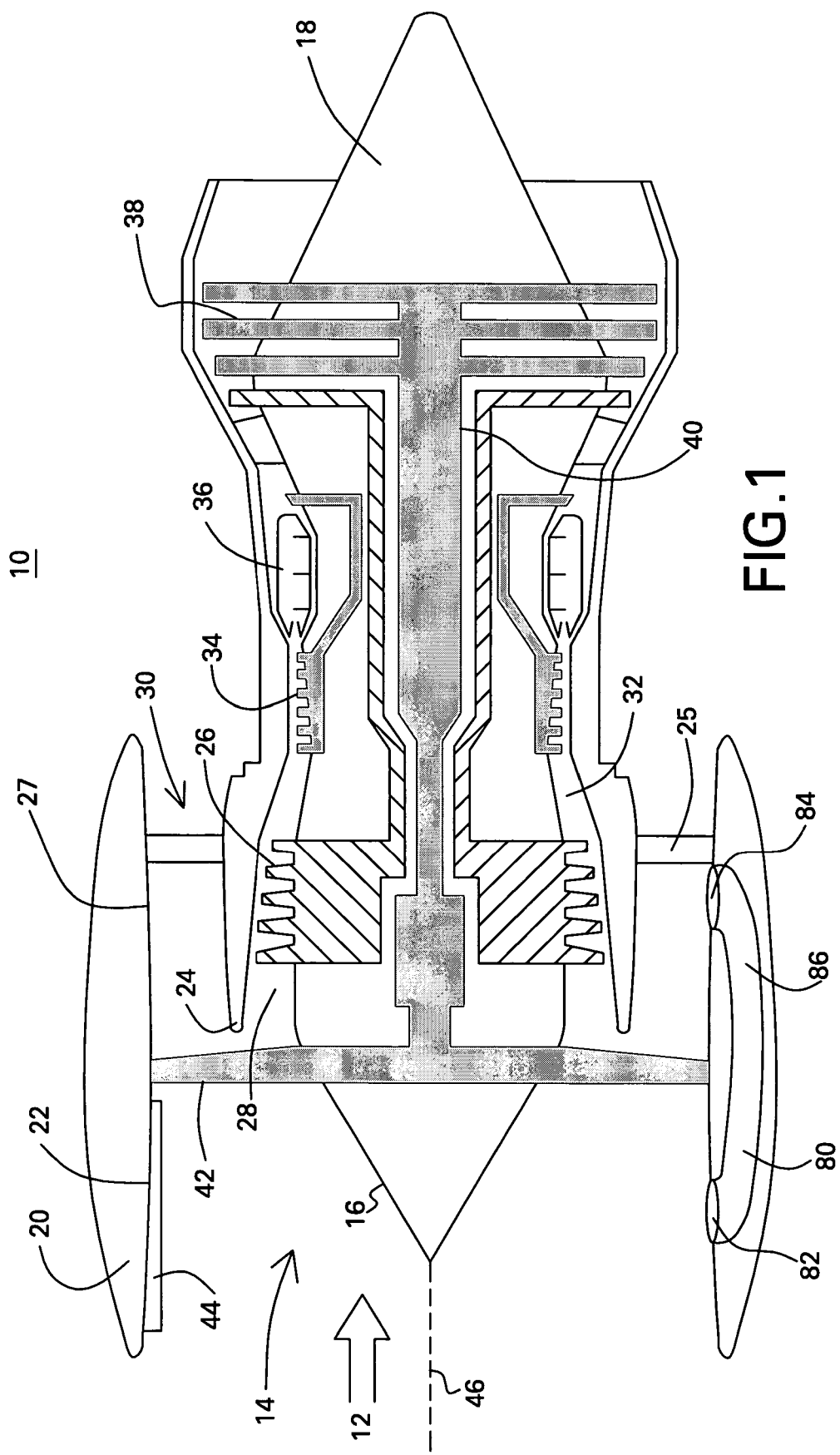
FIG. 1 is a schematic side-view of a turbofan engine including a fluid duct, in an embodiment of the invention.

Referring to the drawings wherein identical reference numerals denote the same elements throughout the various views, FIG. 1 shows a general orientation of a turbofan engine. As ambient inlet airflow 12 enters inlet fan duct 14 of turbofan engine 10 it passes by fan spinner 16, through fan rotor 42, and is split into primary (core) flow stream 28 and bypass flow stream 30 by nose splitter 24. Primary flow stream 28 flows through low pressure compressor 26 and high pressure compressor 34 that compress the air to a high pressure. The compressed air passes through an outlet guide vane to straighten the airflow and eliminate swirling motion or turbulence, a diffuser where air spreads out, and a compressor manifold to distribute the air in a smooth flow. The primary flow stream is then mixed with fuel in combustion chamber 36 and the mixture is ignited and burned. The resultant combustion products flow through turbines 38 that extract energy from the combustion gases to turn fan rotor 42, low pressure compressor 26 and high pressure compressor 34 by way of turbine shaft 40. The gases, passing exhaust cone 18, expand through an exhaust nozzle (not shown) to produce thrust. Primary flow stream 28 leaves the engine at a higher velocity than when it entered. Bypass flow stream 30 flows through fan rotor 42, flows by bypass duct outer wall 27, an annular duct concentric with the core engine, flows through fan discharge outlet guide vanes (OGV) 25, and is expanded through an exhaust nozzle to produce additional thrust. Turbofan engine 10 has a generally longitudinally extending centerline represented by engine axis 46.

Also shown in FIG. 1, fluid duct 80 extends from an opening at fan duct outer wall 22 to an opening downstream of fan rotor 42 and upstream of fan discharge OGV 25. As will be more fully described herein, fluid duct 80 provides a method and system of attenuating sound in inlet fan duct 14 and sound from bypass flow stream 30.

As used herein, the terms "upstream" and "downstream" generally refer to a position in a jet engine in relation to the ambient air inlet and the engine exhaust at the back of the engine. For example, the inlet fan is upstream of the combustion chamber. Likewise, the terms "fore" and "aft" generally refer to a position in relation to the ambient air inlet and the engine exhaust nozzle. Further, as used herein, "reducing a boundary layer and associated turbulence" can refer to reducing the boundary layer, displacement thickness, friction and other turbulence to some level or to elimination. Also, as described herein, the term "typical velocity" generally refers to that air velocity adjacent to an inlet fan duct outer wall (or adjacent to a bypass duct outer wall) maintained by similar aircraft, having those effects as described above, including boundary layer effects, displacement thickness, friction and other turbulence.

Figure 2:
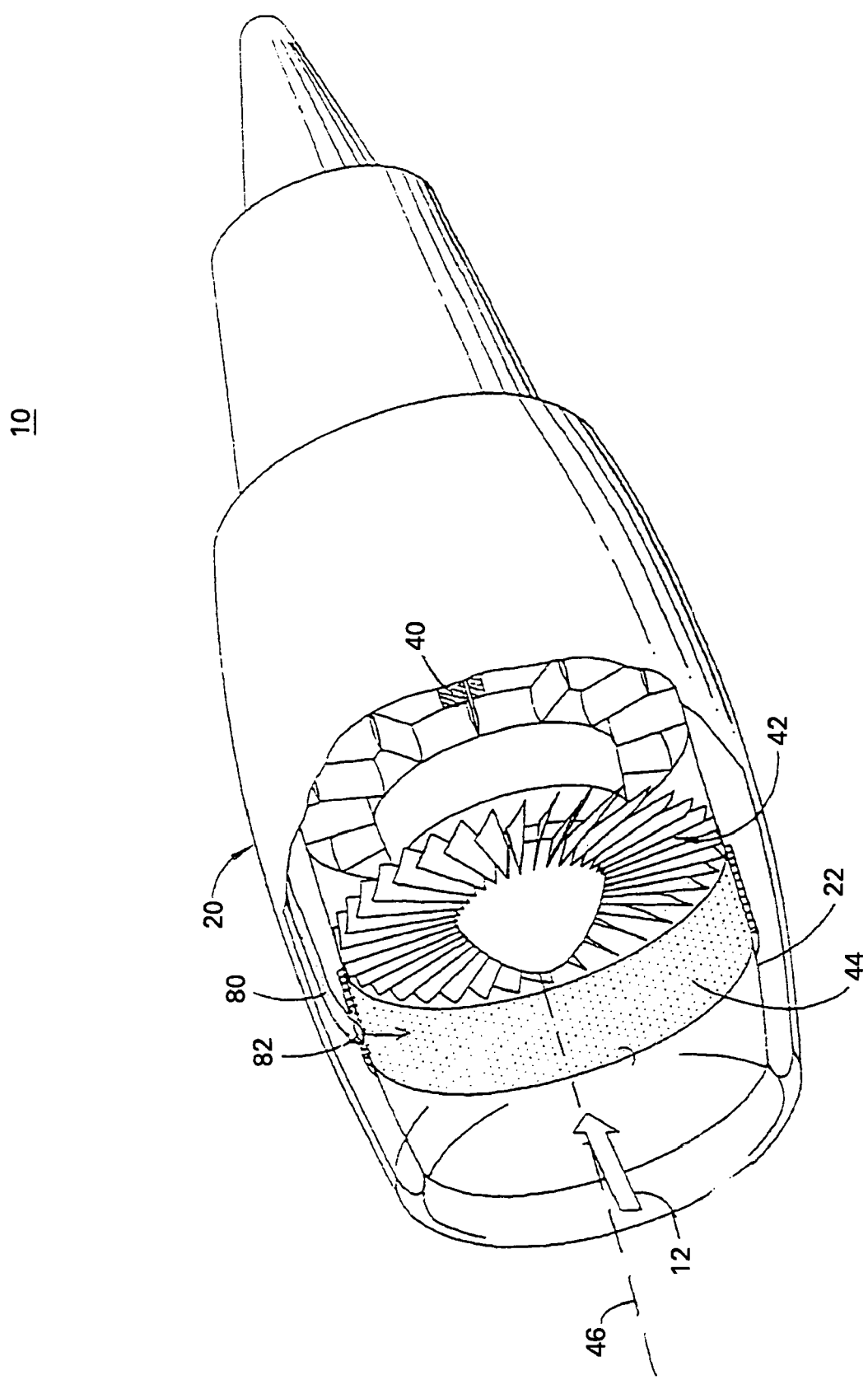
FIG. 2 is a perspective view of a turbofan aircraft gas turbine engine, wherein a portion has been broken away to show a nacelle having an acoustic liner and a fluid duct, in an embodiment of the invention.

FIG. 2 shows turbofan gas turbine engine 10 for powering an aircraft (not shown) in flight. Turbofan engine 10 typically will be attached to the wings, fuselage, or tail of the aircraft through appropriate mountings. In particular, turbofan engine 10 includes nacelle 20 surrounding conventional fan rotor 42, which includes a plurality of circumferentially spaced fan blades powered by power turbine 40. Nacelle 20 defines a fan duct having fan duct outer wall 22 that receives ambient inlet airflow 12 flowing downstream through fan rotor 42 along an axial centerline engine axis 46. Fan rotor 42 rotates within fan nacelle 20, producing discrete tonal noise predominately at the blade passage frequency and multiples thereof, as can be appreciated by those skilled in the art. During operation of fan rotor 42, especially during takeoff of the aircraft when the fan blades reach transonic and supersonic velocities, noise is generated therefrom and propagated out of the fan duct into the surrounding environment. Acoustic liner 44 helps control the fan blade passage frequency (BPF) tone and the first harmonic of the BPF tone. Acoustic liner 44 absorbs sound waves and reduces the level of sound waves radiating from the duct terminations. In order to attenuate the noise generated within nacelle 20, an absorptive acoustic liner 44 is disposed on the radially inner surface of fan duct outer wall 22, upstream of fan rotor 42. Acoustic liner 44 is an annular member that circles the inner surface of the fan duct, namely fan duct outer wall 22. Although acoustic liner 44 is shown to be located in the forward portion of the fan duct, upstream of fan rotor 42, acoustic liner 44 can be disposed in other engine locations where noise suppression is appropriate, such as various ducts or casings throughout turbofan engine 10.

Because of the limitations of acoustic liners as discussed above, fluid duct 80 is useful in attenuating noise. Fluid duct 80 increases air velocity adjacent to fan duct outer wall 22 so that sound modes propagating against the boundary layer are reduced or eliminated and the sound modes are not refracted toward engine axis 46, maximizing the effectiveness of acoustic liner 44. As a result, the external flow is no longer displaced outward an amount (the displacement thickness) and sound propagating at low angles is more likely to strike acoustic liner 44. Fluid duct 80 allows absorptive liner 44 to be more effective in attenuating low mode order noise, i.e., those noise wave fronts traveling along fan duct outer wall 22 at a low angular displacement relative to fan duct outer wall 22. Fluid duct 80 allows low order modes to propagate at steeper angles and strike acoustic liner 44 greater times in a given length of duct.

FIG. 3 shows sound wave propagation in an engine duct. Although the sound waves are shown in FIG. 3 moving from left to right, it is to be appreciated that sound waves substantially propagate upstream from a fan toward an ambient inlet airflow, rather than downstream (left to right). Sound wave fronts 52, 54 and 56 exhibit various angles relative to fan duct outer wall 22. Sound wave front 52 is illustrated as having a 90-degree angle to fan duct outer wall 22, sound wave front 54 shows a smaller angle $\theta_1$ and sound wave front 56 shows an even smaller angle $\theta_2$. Sound wave front 56 is absorbed by an acoustic liner, but sound wave front 54 is refracted away from fan duct outer wall 22, in part by boundary layer 50. It is to be appreciated that there exists other angles in addition to angle $\theta_1$ that are affected by boundary layer 50 and refracted away from fan duct outer wall 22. In an embodiment, as described herein, fluid duct 80 reduces or eliminates refraction of sound wave front 54, and similar refracted sound waves, such that sound wave front 54 is absorbed by an acoustic liner. In an aspect, as used herein, "optimizing refraction and absorption of inlet sound into acoustic liner (44)" generally refers to reducing or eliminating refraction of, for example, sound wave front 54 such that sound wave front 54 is absorbed by acoustic liner 44.

In an embodiment, air velocity adjacent to inlet fan duct outer wall 22 is increased, to a greater rate than typical velocity of an operational engine ambient inlet airflow adjacent to inlet fan duct outer wall 22. The air velocity is increased using injected air adjacent to inlet fan duct outer wall 22 and substantially directed aft of fan rotor 42, the injected air being distinct from ambient inlet air 12. The injected air is extended axially and with circumferential uniformity. In an embodiment, injecting air adjacent to inlet fan duct outer wall 22 causes an air velocity spike adjacent to inlet fan duct outer wall 22, the velocity gradually blending in with the velocity of the more central portion of inlet airflow 12. In an aspect, the boundary layer and associated turbulence adjacent to fan duct outer wall 22 is reduced or eliminated. Refraction of sound into acoustic liner 44 is optimized and inlet sound is absorbed into acoustic liner 44 along inlet fan duct outer wall 22. In an example, the injected air is injected with a mass-flow rate within a range of one percent to two percent of the ambient inlet air. It is to be appreciated that the injected air can be injected with a mass-flow rate greater or less than one or two percent. Air is drawn from at least one of bypass flow stream 30 and core flow stream 28. In the embodiment, air is drawn downstream fan rotor 42 and upstream fan discharge OGV 25. A pressure difference is created to self-aspirate the injected air, wherein inlet fan duct 14 has a first variable pressure, bypass flow stream 30 has a second variable pressure, and core stream 28 has a third variable pressure.

In alternative embodiment, a suction force (rather than injected air) is exerted on the ambient inlet air adjacent to inlet fan duct outer wall 22. In an embodiment, the boundary layer and associated turbulence adjacent to fan duct outer wall 22 is reduced or eliminated. In an example, the suction force draws a mass-flow rate of ambient inlet air within a range of one percent to two percent of ambient inlet airflow 12. In another example, the suction force draws a mass-flow rate of ambient inlet air within a range other than one percent to two percent of ambient inlet airflow 12. It is to be appreciated that a mass-flow rate greater or less than one or two percent can be drawn. A suction force is established and air is injected aft of fan discharge OGV 25.

Referring to FIG. 4, in an embodiment, air flows through fluid duct 80 increasing air velocity adjacent to inlet fan duct outer wall 22, to a greater rate than typical velocity of an operational engine ambient inlet airflow adjacent to an inlet fan duct outer wall. Fluid duct 80 has first end 82 with a slot therein opening to inlet fan duct outer wall 22, body 86 and second end 84 with a slot therein opening to bleed port 32. In another embodiment, second end 84 opens to aft of fan rotor 42. In an embodiment, bleed port 32 opens to low pressure compressor 26. Fluid duct 80 is structured having dimensions for allowing a mass flow rate of air within a range of one percent to two percent of ambient inlet airflow 12. It is to be appreciated that fluid duct 80 can be structured having dimensions for allowing a mass-flow rate of air with a range other than one percent to two percent of ambient inlet airflow 12. First end 82 having a slot is one of a contiguous slot, a segmented slot or discrete holes. In an embodiment, fluid duct 80 is structured to provide a plenum. In an embodiment, tubes are utilized extending from the plenum to discrete holes. First end 82 having a slot is disposed circumferentially along inlet fan duct outer wall 22. Second end 84 is smaller in width than body 86, and second end 84 is structured to provide a steep expansion in width connecting to body 86. First end width 90 and second end width 92 can also be structured to control the mass flow rate of the fluid flow. First end 82, second end 84 and body 86 are structured in an annular form. Fluid duct 80 is substantially disposed within a fan casing, for example, nacelle 20.

Those skilled in the art will appreciate that the effect of boundary layer refraction on sound attenuation is greater for upstream wave propagation within an inlet fan duct than for downstream exhaust wave propagation. Shear flow is also known to have a greater effect on inlet sound attenuation than on the exhaust condition. Accordingly, where injecting air (as opposed to suction) proves more productive to attenuate sound, in an embodiment, as shown in FIG. 5, air is injected adjacent to fan duct outer wall 22 and suction force is exerted on turbulent fluid downstream of fan rotor 42.

In the ambient air inlet, sound waves propagate in the direction opposite to the ambient inlet airflow, whereas, in the exhaust condition, sound waves propagate in the direction of the airflow. Velocity gradients also refract sound toward duct walls for downstream propagation and away from duct walls for upstream propagation. First end 82 of fluid duct 80 is positioned accordingly, and injects air with consideration to these notions. Also, although fluid duct 80 is shown as a single duct, it is to be appreciated that more than one or multiple ducts can be utilized. Further, in an embodiment, the closed loop configuration and the actuation of fluid duct 80 only on takeoff and approach minimizes any engine cycle impact or inflow disturbances.

FIG. 6 shows a suction force being exerted on inlet fan duct 14 and between fan rotor 42 and fan discharge OGV 25. In this embodiment, air is injected aft of fan discharge OGV 25. In an embodiment, air is injected adjacent to bypass duct outer wall 27, providing sound attenuation. The suction force on inlet fan duct 14 and between fan rotor 42 and fan discharge OGV 25 can additionally provide sound attenuation by increasing air velocity and reducing turbulence. In another embodiment, air is suctioned from bleed port 32, within core flow stream 28, to further provide injection air aft of fan discharge OGV 25.

Figure 7:
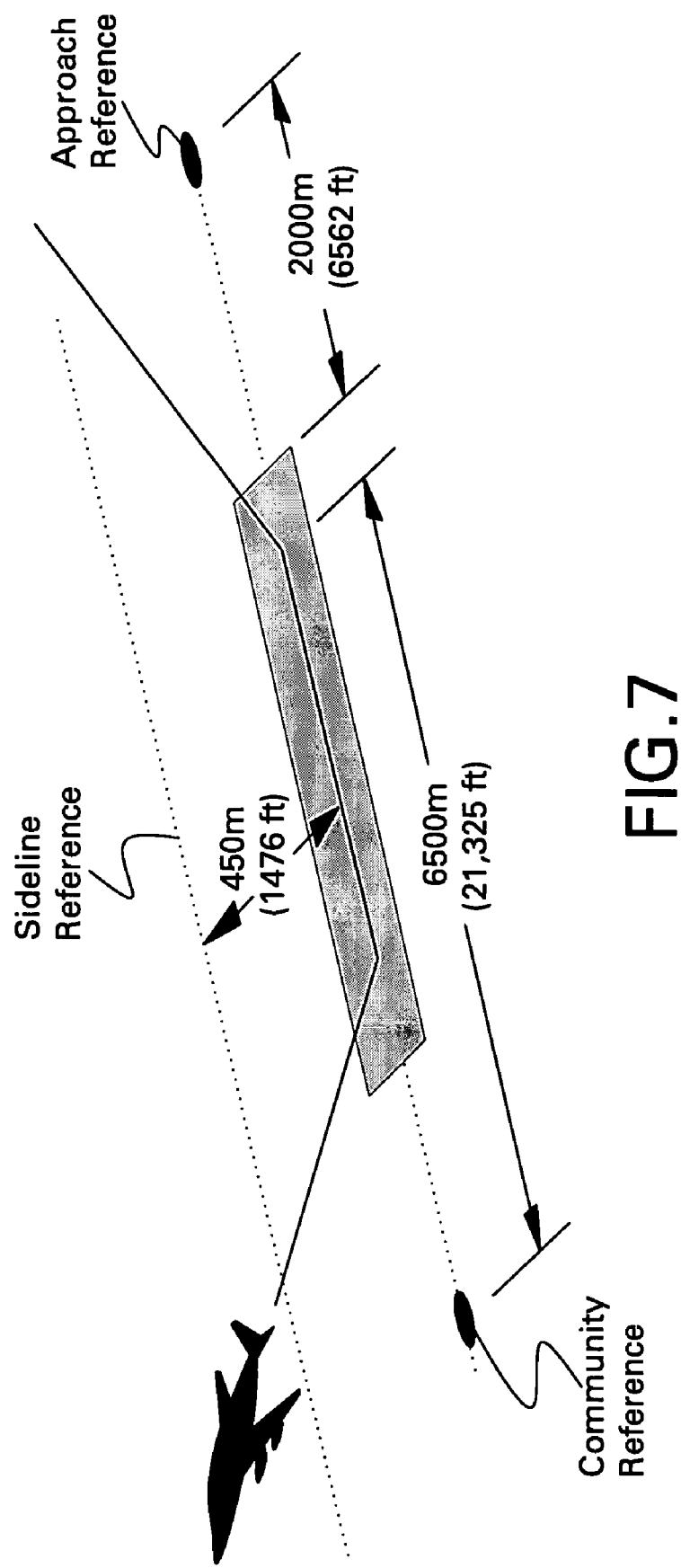
FIG. 7 is a illustration showing ground listening references nearby an aircraft runway.

Referring to FIG. 7, standard positioning of ground listening references nearby an aircraft runway is shown. Ground listening stations include three regulatory noise certification reference locations: sideline (S/L), community (C/B) (also known as takeoff, centerline or cutback location), and approach (APP). Sideline noise is the maximum noise observed along the sideline reference parallel to the runway. Community noise is the maximum noise observed along the community reference along and beyond the runway. Approach noise is the maximum noise observed along the approach reference preceding the runway. Air to ground atmospheric effects, spherical spreading, and other propagation corrections are calculated in determining aircraft noise at these positions. In the turbofan engine industry, the effect of noise on humans is expressed in terms of decibel (dB), based on the bel unit system for noise intensity.

In the case of inlet noise, in an embodiment, up to a 6 dB reduction in noise is provided at a frequency in which peak treatment absorption occurs. In the case of noise downstream of fan rotor 42, the invention provides, in one embodiment, up to a 3 dB reduction in noise, depending on the dominance of the contribution of fan noise to total noise. It is to be appreciated that, in another embodiment, these noise reduction levels can be exceeded.

Figure 8:
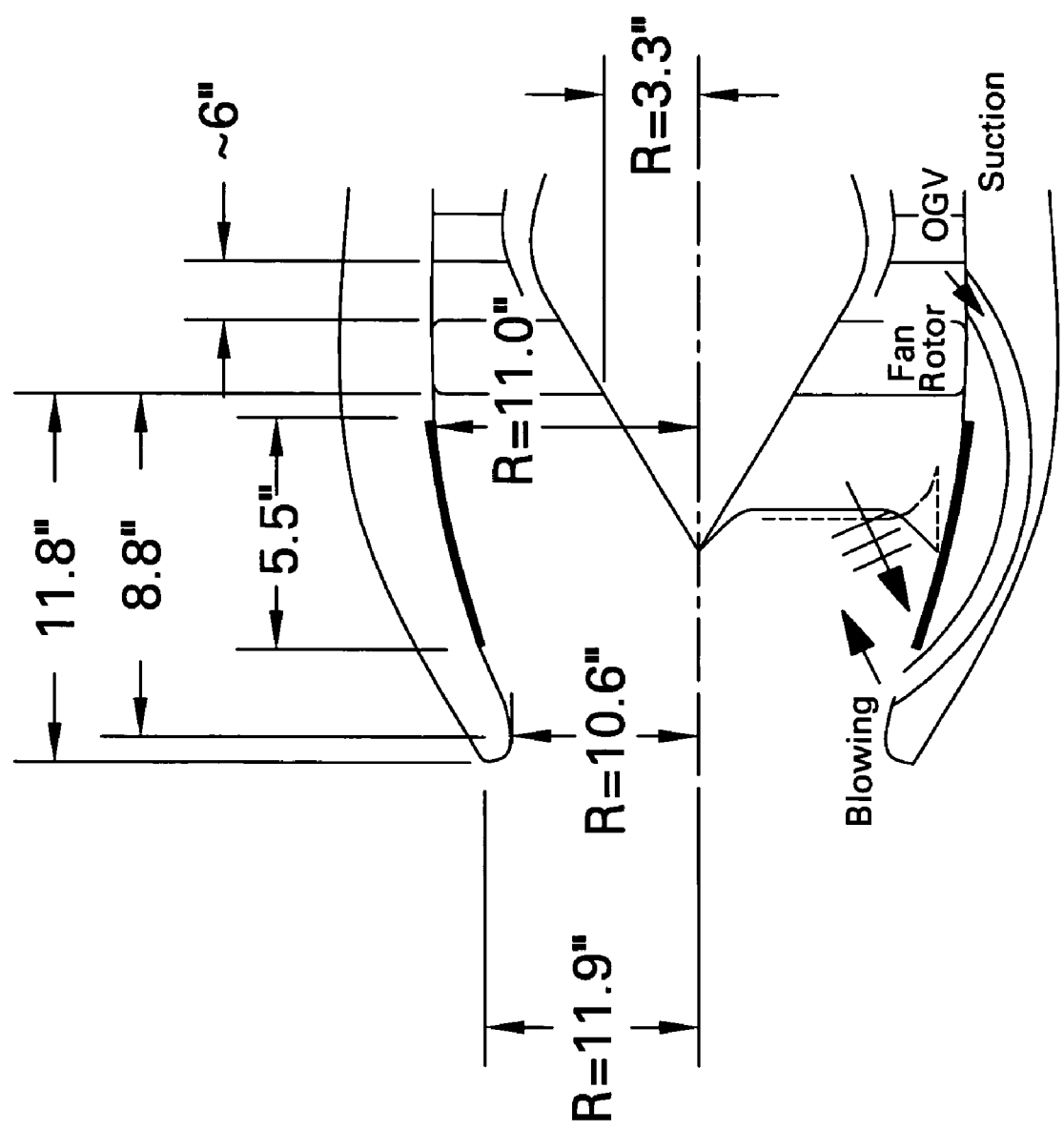
FIG. 8 is a schematic side-elevational, cross-sectional view of a portion of a turbine engine showing a scale model geometry of an inlet fan duct, in an embodiment of the invention.

A further understanding of the above description can be obtained by reference to the following specific examples that are provided for illustrative purposes and are not intended to be limiting. The conceptual examples correspond to a scale model to be tested, as shown in FIG. 8. The geometry of an inlet fan duct is provided, the structure represented similar to FIG. 5 and FIG. 6. The arrows represent, in some instances, a radius (R) measured in inches (").

Air injection/air suction slot width affects mass flow rate. In one case, body width 88 is 0.5 inches in width, second end width 92 is 0.3 inches and first end width 90 is 0.075 inches. Table 1 shows three conditions, including sideline (S/L), cutback (C/B) and approach (APP). The mass flow ($W_{corr}$), fan pressure ratio (FPR), angular velocity of the fan ($\omega$ fan), mach number of the throat inlet (Throat inlet M), and the static pressure aft of the rotor (Ps aft rotor) is shown for all conditions. In an embodiment, assumptions were made for all data in table 1 and table 2, including: an incompressible flow on approach, a 0.5 inch lossless plenum, a sudden expansion to evaluate losses at the suction slot, an inlet throat wherein the total conditions is equal to the ambient standard conditions, a fan rotor having an efficiency of one, an injection slot located at approximately the inlet throat, and an annular slot and annular plenum.

TABLE 1

|  | Wcorr (lbs/s) | FPR | ω fan | Throat Inlet M | Ps Aft Rotor (psia) |
| --- | --- | --- | --- | --- | --- |
| S/L | 98.3 | 1.47 | 12, 161 | 0.57 | 17.55 |
| C/B | 82.1 | 1.31 | 10, 471 | 0.44 | 16.74 |
| APP | 58 | 1.14 | 7, 481 | 0.29 | 15.64 |

Table 2 shows conceptual design results of a self-aspirated suction and blowing scheme, including determinations for an injection flow (Inj W), suction slot velocity (suct slot V), plenum velocity (plenum V), injection total pressure (Inj P0), injection mach number (Inj M), ratio between the slot exit mach number and main flow mach number (DM/M %), and the slot width for the sideline condition, cutback condition and approach condition. In this example, the suction total pressure is assumed equal to the static pressure downstream of the fan rotor.

TABLE 2

|  | Inj W (lb/s) | Suct slot V (m/s) | Plenum V (m/s) | Inj P0 (psia) | Inj M | DM/M (%) | Slot width (in) |
| --- | --- | --- | --- | --- | --- | --- | --- |
| S/L | 1.97 | 63.08 | 33.44 | 17.48 | 0.77 | 35.78 | 0.082 |
| C/B | 1.64 | 49.87 | 26.44 | 16.70 | 0.62 | 41.38 | 0.077 |
| APP | 1.16 | 33.50 | 17.76 | 15.62 | 0.42 | 42.96 | 0.075 |

In an example, a higher performance scheme is obtained if the total pressure of injection is assumed equal to the total pressure downstream of the rotor (as if a scoop is used to collect suction air downstream of the fan rotor) and losses through slots, plenum and pipes are neglected. Table 3 shows a mass flow (Wcorr), fan pressure ratio (FPR), throat inlet (Throat inlet M), Injection flow percentage (Inj W %), injection flow (Inj W lb/s), injection mach number (Inj M), injection area (Inj area in^2), and slot width for the sideline condition, cutback condition and approach condition.

TABLE 3

|  | Wcorr (lb/s) | FPR | Throat inlet M | Inj W (%) | Inj W (lbs/s) | Inj M | Inj area (in 2) | Slot width (in) |
| --- | --- | --- | --- | --- | --- | --- | --- | --- |
| S/L | 98.3 | 1.47 | 0.57 | 2 | 1.97 | 0.97 | 4.12 | 0.062 |
| C/B | 82.1 | 1.31 | 0.44 | 2 | 1.64 | 0.78 | 3.97 | 0.060 |
| APP | 58 | 1.14 | 0.29 | 2 | 1.16 | 0.53 | 3.90 | 0.058 |

As can be seen, the injection flow rates in Table 2 are the same as in Table 3. The injection Mach numbers in Table 3 are higher than those in Table 2 since the total pressure available for injection is higher for the example summarized in Table 3. Therefore, for higher injection Mach numbers, less area is needed for the slots to pass the same amount of mass-flow. The slot widths in Table 3 are smaller than those in Table 2.

Figure 10:
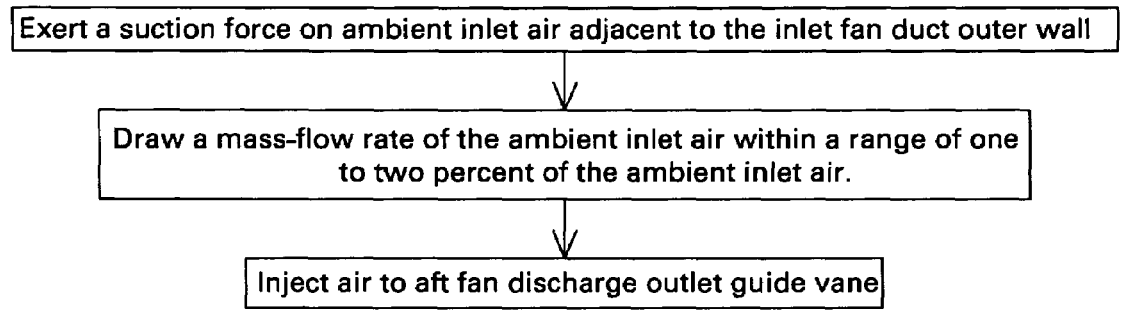
FIG. 10 is another block diagram of a method of attenuating jet engine noise, in an embodiment.
Figure 11:
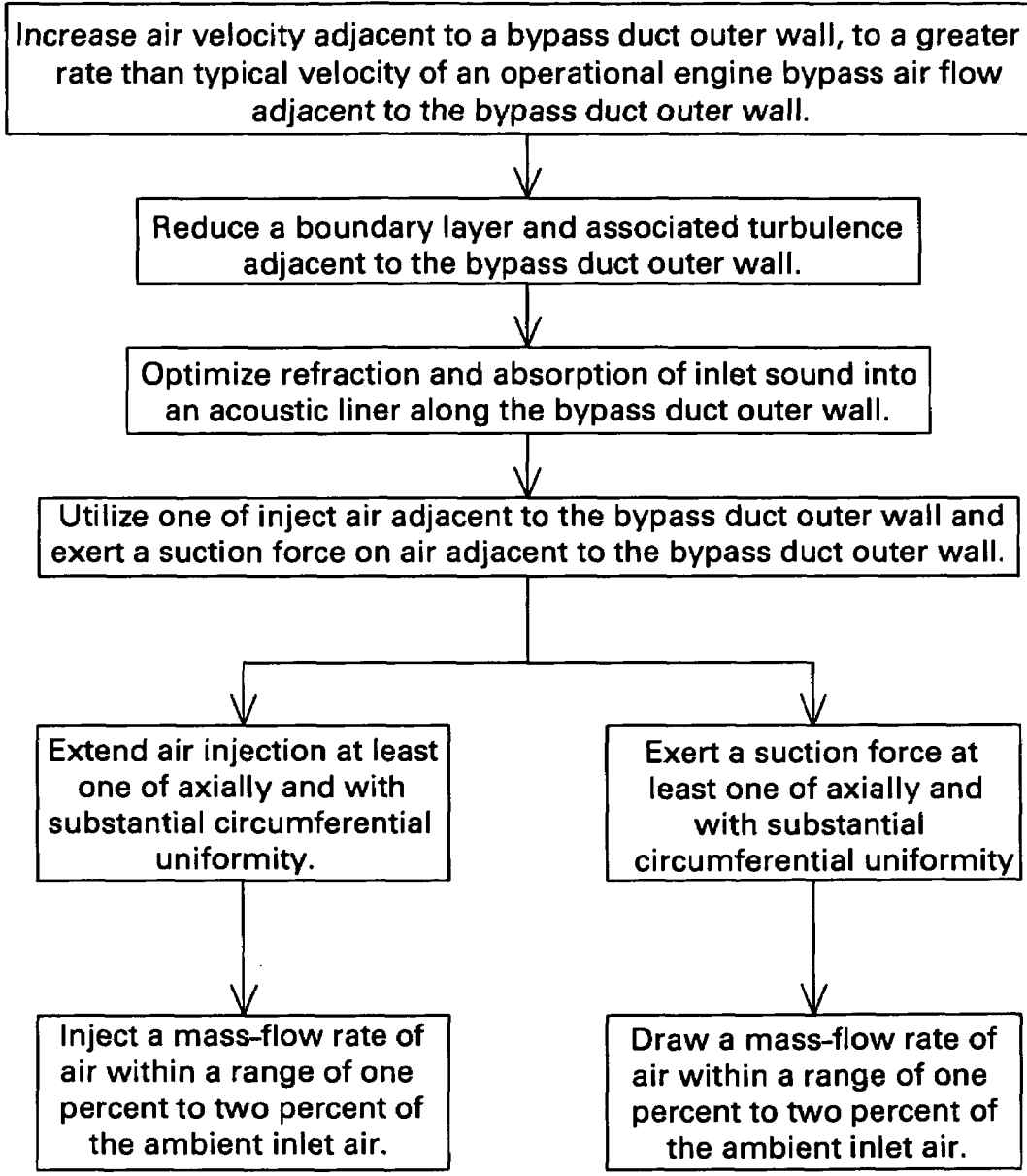
FIG. 11 is another block diagram of a method of attenuating jet engine noise, in an embodiment.

FIG. 9, FIG. 10 and FIG. 11 show block diagrams illustrating described methods of attenuating gas turbine engine noise, in an embodiment.

Having disclosed exemplary embodiments, modifications and variations may be made to the disclosed embodiments while remaining within the spirit and scope of the invention as defined by the appended claims. For example, injected air can be injected with a mass-flow rate greater or less than one or two percent. Further, the shape, orientation and positioning of fluid duct 80 may be varied from that described herein.

We claim:

1. A system to attenuate jet engine noise comprising:
 a fluid duct for increasing air velocity adjacent to an inlet fan duct outer wall,
 wherein said fluid duct has a first end with a slot therein opening to said inlet fan duct outer wall, a body, and a second end with a slot therein opening to aft of a fan rotor, the slot in the first end being disposed upstream of the fan rotor, wherein said fluid duct is configured such that air flows from the first end, though the body, and is injected aft of the fan rotor from the second end of said fluid duct, and wherein said fluid duct is structured of sufficient dimension for allowing a mass flow rate of air within a range of one percent to two percent of said ambient inlet air.

2. The system as in claim 1, wherein said fluid duct is structured to provide a plenum.

3. The system as in claim 1, wherein said fluid duct is substantially disposed within a nacelle.

4. A system to attenuate jet engine noise comprising:
a fluid duct for increasing air velocity adjacent to an inlet fan duct outer wall,
wherein said fluid duct has a first end with a slot therein opening to said inlet fan duct outer wall, a body, and a second end with a slot therein opening to aft of a fan rotor, the slot in the first end being disposed upstream of the fan rotor, wherein said fluid duct is configured such that air flows from the first end, though the body, and is injected aft of the fan rotor from the second end of said fluid duct, and wherein said first end having a slot therein further comprises one of a contiguous slot therein and a segmented slot therein.

5. A system to attenuate jet engine noise comprising:
a fluid duct for increasing air velocity adjacent to an inlet fan duct outer wall,
wherein said fluid duct has a first end with a slot therein opening to said inlet fan duct outer wall, a body, and a second end with a slot therein opening to aft of a fan rotor, the slot in the first end being disposed upstream of the fan rotor, wherein said fluid duct is configured such that air flows from the first end, though the body, and is injected aft of the fan rotor from the second end of said fluid duct, and wherein said first end having a slot therein disposed circumferentially along said inlet fan duct outer wall.

6. A system to attenuate jet engine noise comprising:
a fluid duct for increasing air velocity adjacent to an inlet fan duct outer wall,
wherein said fluid duct has a first end with a slot therein opening to said inlet fan duct outer wall, a body, and a second end with a slot therein opening to aft of a fan rotor, the slot in the first end being disposed upstream of the fan rotor, and wherein said second end is smaller in width than said body, said second end structured to provide a steep expansion in width connecting to said body.

7. A system to attenuate jet engine noise comprising:
a fluid duct for increasing air velocity adjacent to an inlet fan duct outer wall;
wherein said fluid duct has a first end with a slot therein opening to said inlet fan duct outer wall, a body, and a second end with a slot therein opening to aft of a fan rotor, the slot in the first end being disposed upstream of the fan rotor, wherein said fluid duct is configured such that air flows from the first end, though the body, and is injected aft of the fan rotor from the second end of said fluid duct, and wherein at least one of said first end having a slot therein, said second end having a slot therein and said body is structured in an annular form.

8. A system to attenuate jet engine noise comprising:
a nacelle surrounding a fan rotor and a fan discharge outlet guide vane; said nacelle having an inlet fan duct outer wall;
an acoustic liner attached to said nacelle;
a turbine shaft for generating motive forces on said fan rotor; and
a fluid duct for increasing air velocity adjacent to said inlet fan duct outer wall;
wherein said fluid duct has a first end with a slot therein opening to said inlet fan duct outer wall, a body, and a second end with a slot therein opening to aft of said fan rotor, the slot in the first end being disposed upstream of the fan rotor, wherein said fluid duct is configured such that air flows from the first end, though the body, and is injected aft of the fan rotor from the second end of said fluid duct, and wherein said first end having a slot therein further comprises one of a contiguous slot therein and a segmented slot therein.

9. The system as in claim 8, wherein said fluid duct is structured of sufficient dimension for allowing a mass flow rate of air within a range of one percent to two percent of said ambient inlet air.

10. The system as in claim 8, wherein said fluid duct is structured to provide a plenum.

11. The system as in claim 8, wherein said fluid duct is substantially disposed within said nacelle.

12. A system to attenuate jet engine noise comprising:
a nacelle surrounding a fan rotor and a fan discharge outlet guide vane; said nacelle having an inlet fan duct outer wall;
an acoustic liner attached to said nacelle;
a turbine shaft for generating motive forces on said fan rotor; and
a fluid duct for increasing air velocity adjacent to said inlet fan duct outer wall;
wherein said fluid duct has a first end with a slot therein opening to said inlet fan duct outer wall, a body, and a second end with a slot therein opening to aft of said fan rotor, the slot in the first end being disposed upstream of the fan rotor, wherein said fluid duct is configured such that air flows from the first end, though the body, and is injected aft of the fan rotor from the second end of said fluid duct, and wherein said first end having a slot therein disposed circumferentially along said inlet fan duct outer wall.

13. A system to attenuate jet engine noise comprising:
a nacelle surrounding a fan rotor and a fan discharge outlet guide vane; said nacelle having an inlet fan duct outer wall;
an acoustic liner attached to said nacelle;
a turbine shaft for generating motive forces on said fan rotor; and
a fluid duct for increasing air velocity adjacent to said inlet fan duct outer wall;
wherein said fluid duct has a first end with a slot therein opening to said inlet fan duct outer wall, a body, and a second end with a slot therein opening to aft of said fan rotor, the slot in the first end being disposed upstream of the fan rotor, and wherein said second end is smaller in width than said body, said second end being structured to provide a steep expansion in width connecting to said body.

14. A system to attenuate jet engine noise comprising:
a nacelle surrounding a fan rotor and a fan discharge outlet guide vane; said nacelle having an inlet fan duct outer wall;
an acoustic liner attached to said nacelle;
a turbine shaft for generating motive forces on said fan rotor; and
a fluid duct for increasing air velocity adjacent to said inlet fan duct outer wall;
wherein said fluid duct has a first end with a slot therein opening to said inlet fan duct outer wall, a body, and a second end with a slot therein opening to aft of said fan rotor, the slot in the first end being disposed upstream of the fan rotor, wherein said fluid duct is configured such that air flows from the first end, though the body, and is injected aft of the fan rotor from the second end of said fluid duct, and wherein at least one of said first end having a slot therein, said second end having a slot therein and said body is structured in an annular form.

* * * * *

UNITED STATES PATENT AND TRADEMARK OFFICE
CERTIFICATE OF CORRECTION

PATENT NO. : 7,631,483 B2  Page 1 of 1
APPLICATION NO. : 10/664695
DATED : December 15, 2009
INVENTOR(S) : Mani et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1265 days.

Signed and Sealed this

Second Day of November, 2010

David J. Kappos
*Director of the United States Patent and Trademark Office*